Sept. 12, 1950 R. P. ROETTER 2,521,804
RADAR TARGET DISTANCE INDICATOR
Filed April 17, 1946

INVENTOR.
Robert P. Roetter
BY
ATTORNEY

Patented Sept. 12, 1950

2,521,804

UNITED STATES PATENT OFFICE 2,521,804

RADAR TARGET DISTANCE INDICATOR

Robert P. Roetter, Westmont, N. J., assignor to Radio Corporation of America, a corporation of Delaware Application April 17, 1946, Serial No. 662,796

7 Claims. (Cl. 343—13)

The present invention relates to radar receivers display and more particularly to indicating the range of a target.

An object of the invention is to provide a device for measuring the distance of one object from a certain point.

Another object of the invention is to measure the range of a target by radio signal pulses.

A further object is to measure the distance of an object by the combined use of radio signal pulses and sound waves.

A still further object is to provide an indicator wherein radio signal pulses and sound waves visibly appear for comparing the time required for a radio signal pulse to reach a target and return with the time of travel of a sound wave produced simultaneously with the radio signal pulse.

To provide other improvements as will hereinafter appear.

Figure 1:
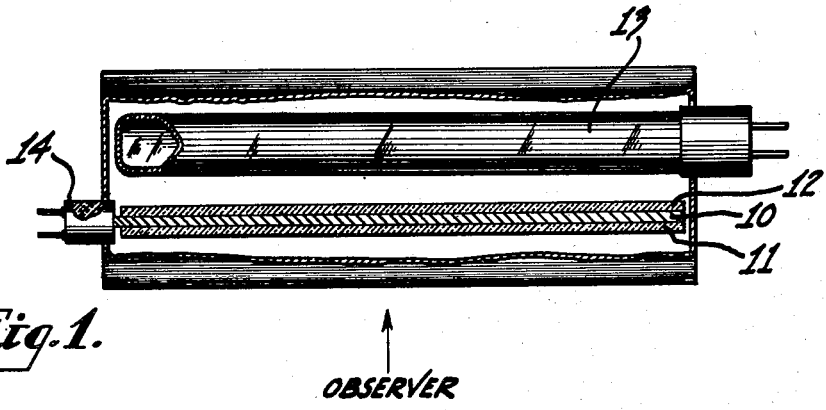
Figure 2:
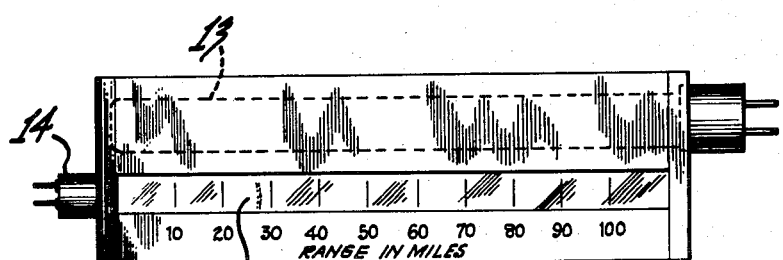
Figure 3:
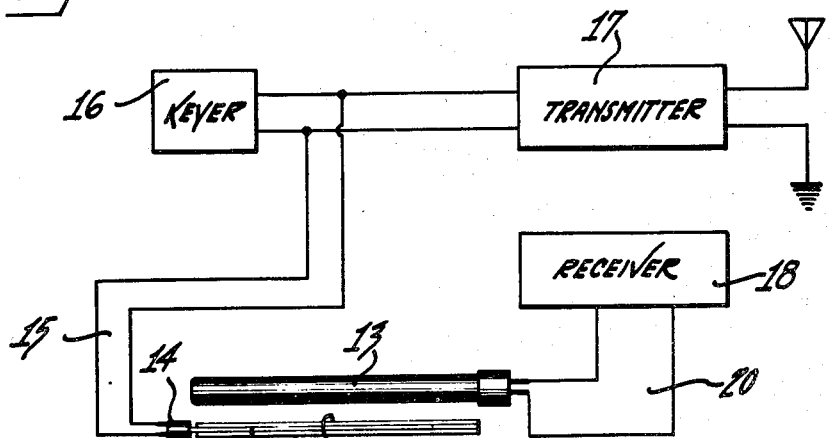

In the accompanying drawings, Fig. 1 represents a plan embodying one form of indicator of the present invention; Fig. 2 represents a front elevation of the same; and Fig. 3 represents a diagram of one circuit system for association with the indicator.

Referring to the drawings, one form of target measuring indicator comprises a relatively long, flat strip of transparent material 10, such as methyl methacrylate or cellulose acetate butyrate or other transparent material capable of visibly displaying lines of stress due to shock when viewed between two pieces of polarizing material. This strip 10 is mounted between two pieces of polarizing material 11 and 12, which latter are so dimensioned as to cover both faces of the strip 10. Opposite to and alined with the strip 12 is a gas filled tube 13 of the type which will serve as a quick flash light source when energized by a signal pulse.

In order to produce the required shock to set up lines of stress in the strip 10, one form of the invention utilizes a crystal 14, such as a Rochelle salt crystal, arranged in close proximity to or in contact with one end of the strip 10, and serving when electrified to impart a blow to the strip 10. The operation of such a crystal is fully explained in United States patent to Nicolson, No. 1,562,578. The crystal 14 is included in a circuit 15 which is in parallel with the output of an impulse keyer 16 leading to the radio signal transmitter 17. A receiver 18 is arranged to receive the reflected signal pulse and has its output 20 leading to and serving to energize the tube 13. Consequently, as the signal pulse is received back from the target it flashes the quick flash light source, which in turn makes the stress wave visible. The position of the shock front indicates the distance the signal pulse has traversed. This distance is indicated upon a scale 21 mounted in operative association with respect to the polarizing member 11, which latter may be provided with graduations respectively alined with the scale members. As shown, the scale 21 is calibrated in range miles. Thus, an observer in front of the member 11 can check the position of the sound wave at the time of the radar pulse light flash.

The principle upon which the indicator works is based upon the fact that the lines of stress of a transparent member become visible when viewed between two pieces of polaroid. The speed of sound in a solid media is much slower than the speed of radio signal pulses; however, if the distance the sound travelled was very short compared to the target range, then the two can be favorably compared. A shock wave in a media will travel with the speed of sound.

In accordance with the present invention a signal pulse is sent out at the same instance the shock is applied to the strip 10, hence the position of the shock wave at any instance is an indication of the distance the signal pulse has traversed. The applied shock produces stress in the strip 10 and as the signal pulse is received back from the target it flashes the quick flash light of tube 13 so that the stress wave becomes visible and the shock front then read upon the scale 21.

To find the length of the scale needed on the assumption of a one hundred mile range and assuming also that the transparent material is cellulose acetate butyrate having the following physical properties:

$E = $ Young's Modulus $= .6 \times 10^5 \times 144$ lb./ft.$^2$ $D = $ Absolute density $= \dfrac{1.21 \times 62.4}{32}$ $\dfrac{\text{lb. sec.}^2}{\text{ft.}^4}$ $S = \sqrt{\dfrac{.6 \times 10^5 \times 144 \times 32}{1.21 \times 62.4} \times \dfrac{\text{lb.}}{\text{ft.}^2} \times \text{lb.} \times \dfrac{\text{sec.}^2}{\text{ft.}^4}} = $ 1900 ft./sec.

Round trip time for signal pulse $\dfrac{200}{186,000} = \dfrac{1}{930}$ secs.

A scale covering a 100 mile range should then be long enough so that sound would take $1/930$ seconds to travel its length.

Length of Cellulose Acetate Butyrate scale =

$\dfrac{1900}{930} = 2.04$ ft.

Scale length $= 12 \times 2.04 = 24.48$ inches.

The length of the scale varies directly as the speed of sound in the material selected. The faster sound is transmitted by the media the longer the dial must be.

It will now be apparent that a novel method and apparatus has been devised whereby the distance of a target from a certain point can be measured by comparing the time for the trip of signal waves to and from a target to the time of travel of a sound wave.

Having thus described my invention, I claim:

1. The method of measuring the distance of a target, comprising the steps of sending a radio signal towards a target to be reflected therefrom, simultaneously producing a sound wave, causing the reflected signal to illuminate the position of the sound wave at the instant the signal returns from the target, and measuring the travel of the sound wave to the illuminated position as a function of the distance of the target.

2. The method of measuring the distance of a target, comprising the steps of sending a radio signal towards a target to be reflected therefrom, simultaneously producing a sound wave, causing the reflected signal to visibly indicate the sound wave at the instant the signal returns from the target, and measuring the travel of the sound wave to the visibly indicated position as a function of the distance of the target.

3. An apparatus for measuring the distance of a target, comprising a strip of transparent material, two pieces of polarizing material bounding opposite sides respectively of said strip, means to send a radio signal towards a target, means to cause a sound wave to enter said strip at the instant said signal is sent, and means actuated by the returning signal to illuminate said strip, whereby lines of stress in said strip become visible and the position of said sound wave determined.

4. An apparatus for measuring the distance of a target, comprising a strip of transparent material, two pieces of polarizing material bounding opposite sides respectively of said strip, means to send a radio signal towards a target, means to cause a sound wave to enter said strip at the instant said signal is sent, means actuated by the returning signal to illuminate said strip, whereby lines of stress in said strip become visible and the position of said sound wave determined, and a scale mounted in juxtaposed relation to said strip to indicate the determined position of said sound wave as a function of the distance of the target.

5. An apparatus for measuring the distance of a target, comprising a strip of transparent material, two pieces of polarizing material bounding opposite sides respectively of said strip, means to send a radio signal towards a target, means to cause a sound wave to enter said strip at the instant said signal is sent, a radio receiver, and a gas filled tube connected to the output of said receiver, said tube being arranged to direct light waves through said strip, whereby lines of stress in said strip become visible to indicate the position of said sound wave when said receiver responds to the returning signal from the target.

6. An apparatus for measuring the distance of a target, comprising a strip of transparent material, two pieces of polarizing material bounding opposite sides respectively of said strip, means for sending a radio signal, means actuated by said sending means to apply a shock to one end of said strip to produce a sound wave at the instant said signal is transmitted, a radio receiver, and a gas filled tube connected to the output of said receiver, said tube being arranged to direct light waves through said strip, whereby shock lines of stress in said strip become visible to indicate the position of said sound wave when said receiver responds to the returning signal from the target.

7. An apparatus for measuring the distance of a target, comprising a strip of transparent material, two pieces of polarizing material bounding opposite sides respectively of said strip, means for sending a radio signal, means actuated by said sending means to apply a shock to one end of said strip to produce a sound wave at the instant said signal is transmitted, a radio receiver, a gas filled tube connected to the output of said receiver, said tube being arranged to direct light waves through said strip, whereby shock lines of stress in said strip become visible to indicate the position of said sound wave when said receiver responds to the returning signal from the target, and a scale mounted in juxtaposed relation to said strip and graduated in terms of distance, whereby the visible position of the shock wave can be read on the scale as a function of the target distance.

ROBERT P. ROETTER.

REFERENCES CITED

The following references are of record in the file of this patent:

UNITED STATES PATENTS

| Number | Name | Date |
|---|---|---|
| 2,407,294 | Shockley | Sept. 10, 1946 |
| 2,416,337 | Mason | Feb. 25, 1947 |
| 2,418,964 | Arenberg | Apr. 15, 1947 |
| 2,426,245 | Skellett | Aug. 26, 1947 |